United States Patent [19]
Smith et al.

[11] Patent Number: 5,524,109
[45] Date of Patent: Jun. 4, 1996

[54] TOKEN RING CONCENTRATOR HAVING RETIMING FUNCTION

[75] Inventors: Robert W. Smith, Los Altos; Kris Kalbarczyk, Pleasanton; Julio J. Guerra, Foster City, all of Calif.

[73] Assignee: Bay Networks, Incorporated, Santa Clara, Calif.

[21] Appl. No.: 432,958

[22] Filed: May 1, 1995

Related U.S. Application Data

[63] Continuation of Ser. No. 214,011, Mar. 15, 1994, abandoned, which is a continuation of Ser. No. 879,610, May 7, 1992, abandoned, which is a continuation-in-part of Ser. No. 718,271, Jun. 20, 1991, abandoned.

[51] Int. Cl.$^6$ .......................... H04L 12/417; H04L 7/033
[52] U.S. Cl. .......................... 370/56; 370/85.5; 370/105.3
[58] Field of Search ................... 370/85.4, 85.5, 370/97, 56, 85.15, 100.1, 105.3; 375/211, 212, 213, 214, 328, 333, 354, 355, 359; 340/825.05

[56] References Cited

U.S. PATENT DOCUMENTS

| | | | |
|---|---|---|---|
| 3,902,014 | 8/1975 | Lindell et al. | 375/4 |
| 4,313,206 | 1/1982 | Woodward | 375/110 |
| 4,320,525 | 3/1982 | Woodward | 375/110 |
| 4,450,572 | 5/1984 | Stewart et al. | 375/110 |
| 4,556,864 | 12/1985 | Roy | 375/7 |
| 4,675,881 | 6/1987 | Chung | 375/110 |
| 4,698,826 | 10/1987 | Denkez et al. | 375/3 |
| 4,737,970 | 4/1988 | Viola et al. | 375/97 |
| 4,949,334 | 8/1990 | Bernhardt | 370/55 |
| 5,014,286 | 5/1991 | Ransijn | 375/110 |
| 5,046,073 | 9/1991 | Sexton | 375/82 |
| 5,088,106 | 2/1992 | Kitamura et al. | 375/4 |
| 5,101,405 | 3/1992 | Bekki et al. | 370/56 |
| 5,103,466 | 4/1992 | Bazes | 375/110 |
| 5,157,531 | 10/1992 | Foglia | 375/56 |
| 5,164,966 | 11/1992 | Hershberger | 375/110 |
| 5,197,082 | 3/1993 | Uda et al. | 375/4 |
| 5,245,635 | 9/1993 | Martinez et al. | 375/110 |

OTHER PUBLICATIONS

Bell Telephone Laboratories, Inc., "Transmission Systems for Communication," 1971.
J. M. Manley, "The Generation and Accumulation of Timing Noise in PDM Systems—An Experimental and Theoretical Study," *The Bell Systems Technical Journal*, Mar. 1969.
J. S. Mayo, "A Bipolar Repeater for Pulse Code Modulation Signals," *The Bell System Technical Journal*, Jan., 1962.
R. J. S. Bates and L. A. Sauer "Jitter accommodation in token–passing ring LANs", *IBM Journal of Research and Development*, vol. 29, No. 6, Nov. 1985.
Stallings, Data and Computer Communications, 1988, p. 73.

*Primary Examiner*—Wellington Chin
*Assistant Examiner*—Chau T. Nguyen
*Attorney, Agent, or Firm*—Blakely, Sokoloff, Taylor & Zafman

[57] ABSTRACT

A token ring local area network concentrator which permits computers and other types of data terminal equipment to communicate with each other. The concentrator has several ports for connecting to the data terminal equipment and to other concentrators, with each port for connecting to the data terminal equipment having associated circuitry for regenerating and retiming data in the ring so as to reduce amplitude and phase distortion such as phase jitter. The associated circuitry includes a passive L/C tank circuit which is excited by the received data and which rings or resonates at a frequency which is preferably an integral multiple of the frequency or bit rate of the received data. The tank circuit functions to remove much of the phase jitter from the received data, thereby permitting a large number of data terminal equipment to be added to the ring and permitting longer lobe cable lengths, with lobe cables functioning to connect the data terminal equipment to the concentrator.

24 Claims, 9 Drawing Sheets

TOKEN RING CONCENTRATOR HAVING RETIMING FUNCTION

CROSS REFERENCE TO RELATED APPLICATIONS

This is a continuation of application Ser. No. 08/214,011, filed Mar. 15, 1994, abandoned which is a continuation of application Ser. No. 07/879,610, filed May 7, 1992, abandoned, which is a continuation-in-part of Ser. No. 718,271 filed on Jun. 20, 1991, now abandoned.

BACKGROUND OF THE INVENTION

1. Field of the Invention

The present invention relates generally to local area networks for interconnecting computers and, in particular, to concentrators for token ring local area networks having regeneration and retiming circuitry.

2. Description of Related Art

Local area networks are commonly used for interconnecting computers. One type of network is the well known token passing ring ("token ring") network which typically includes a star-wired ring utilizing a structured cabling system. A set of stations, such as personal computers, are serially connected by a transmission media.

Figure 1:
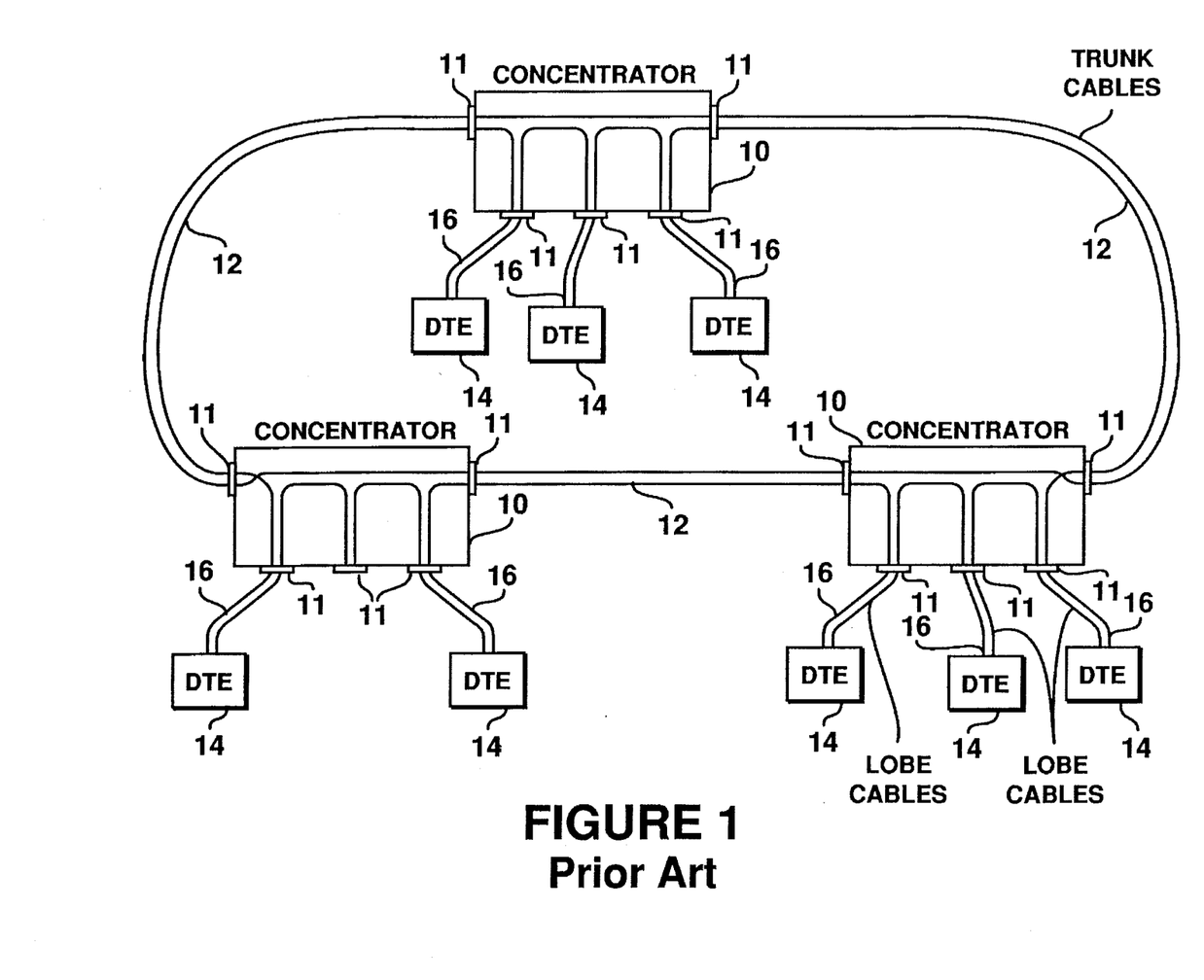
FIG. 1 is a diagram illustrating an exemplary conventional token ring network topology which includes three concentrators.

FIG. 1 depicts a representative token ring network which includes three concentrators 10, each of which is typically located in a separate wiring closet. The concentrators 10 are connected together by way of trunk cables 12. Each concentrator 10 has five ports 11, three of which may be connected to separate data terminal equipment (DTE) 14, such as personal computers. The remaining two ports 11 are for connecting to other concentrators. The DTE 14 are connected by way of lobe cables 16 which extend from the DTE to the wiring closet in which the associated concentrator 10 is located and then to the concentrator itself.

The network includes two functional types of stations (DTEs), including one station which acts as an active monitor and the remaining stations which function as standby monitor stations. The active monitor has a number of important functions. One function is to send out the tokens which circulate around the ring for other stations to append to their data packets. All data packets make one complete transit around the ring from the source station to the destination station and back to the source station. The active monitor also sets the frequency of the ring by sourcing its transmission from an internal crystal oscillator. Furthermore, the active monitor absorbs the jitter which is accumulated as the data transverse the ring.

Figure 2:
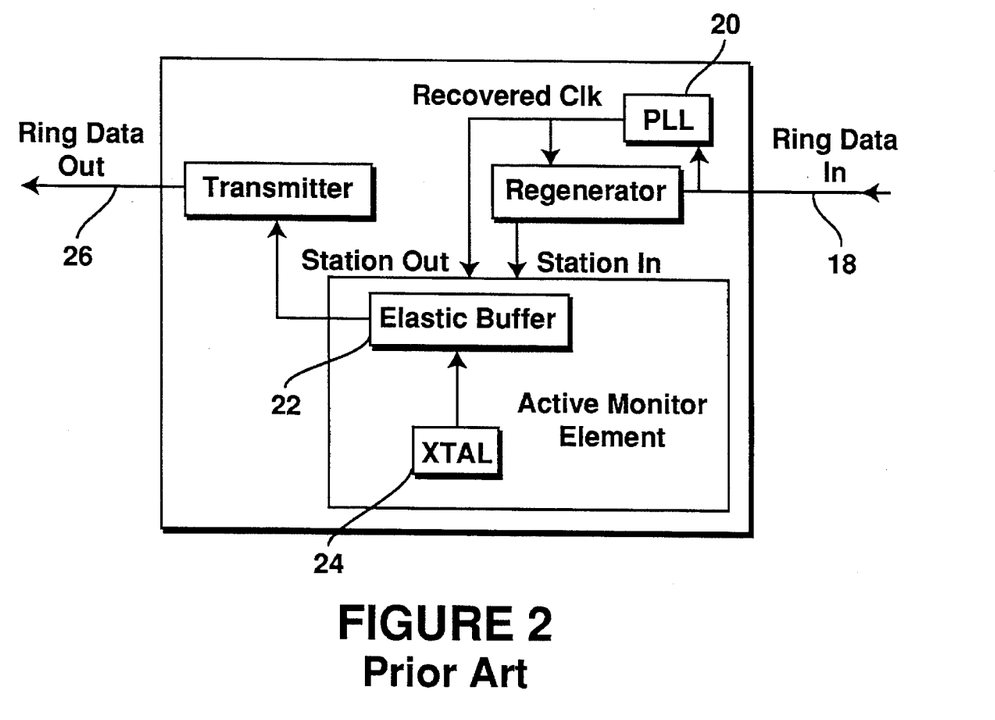
FIG. 2 is a block diagram of a conventional timing/regeneration element of a network station (such as a DTE) which utilizes a phase locked loop (PLL) for clock recovery.

Each station or DTE includes an adapter card for connecting the station to the network. FIG. 2 is a very simplified block diagram of the clocking elements of the adapter card. Differential Manchester encoded data from the previous station is received on line 18 and fed to a phase locked loop (PLL) 20 which extracts a clock from the data. In the case of the active monitor, the extracted clock is used to load the data into a latency buffer which includes an elastic buffer 22. A clock generated by a crystal oscillator 24 is then used to read the data out of the buffer for forwarding to the next station of the ring, as shown by line 26. In the case of the standby monitor stations, the extracted clock from the PLL 20 is used for both receiving and transmitting the data.

The jitter accumulated by the data as it traverses the ring can be grouped into two categories. The first is systemic jitter caused by intersymbol interference, cable dispersion and non-ideal circuit elements within the ring path. Systemic jitter is proportional to the number of stations on the ring. The second type of jitter is random jitter which is generally attributable to noise sources such as non-ideal circuit elements and crosstalk.

The total accumulated jitter on the ring must be less than the size of the elastic buffer 22 in order for the ring to operate. Thus, the buffer size determines the maximum number of stations on the ring. Another limiting characteristic in the token ring is the eye closure. Cable attenuation and induced jitter are the two dominant factors affecting eye opening. This serves to define the maximum lobe cable 16 (FIG. 1) length, maximum number of concentrators and the maximum trunk cable 12 (FIG. 1) length.

The frequency of operation of token rings has increased from 4 Mb/s to 16 Mb/s which magnifies the problems associated with jitter. Furthermore, the use of unshielded twisted pair (UTP) has become more popular which results in greater crosstalk in comparison to shielded twisted pair (STP). This also causes increased jitter.

There are passive concentrators which simply route the received data from one DTE to the next DTE on the ring. Such concentrators do nothing to reduce the effects of jitter. Active concentrators have been used which regenerate the data, but do not provide retiming. These concentrators function to minimize jitter associated with crosstalk, but do not filter the high frequency jitter as does the phase locked loop in each station. There has been a suggestion to provide both a regenerating function and a retiming function in concentrators. The regeneration function restores the signal amplitude and the retiming function, to be carried out utilizing a PLL similar to that used in the stations (FIG. 2), removes some of the unwanted jitter.

While the use of a PLL similar to that in the stations is an acceptable method of recovering a clock, the increased complexity of the circuitry causes severe penalties to implementation in the concentrator. These disadvantages include increased cost, lower reliability, and the need for a significant amount of area on the printed circuit board in the concentrator which ultimately limits the number of ports which may be implemented on the concentrator.

Integrated circuit PLLs are less than satisfactory for the present application because they typically use a low performance R-C multivibrator which produces a high phase noise. A very wide band loop filter is required to remove the wide band phase noise associated with such multivibrators. For example, for operation at 16 MB/s, the loop bandwidth is 1 MHz. This requires active components in the loop filter with bandwidths of at least 10 MHz to avoid instability in the PLL due to inadequate phase margins. This is not easily achieved.

The present invention overcomes the above-noted problems which arise when an active concentrator utilizes a PLL for clock recovery. The disclosed concentrator provides timing recovery without the attendant problems of PLLs. The circuitry is reduced because the requirement for a separate voltage controlled oscillator, phase comparator, loop filter and frequency acquisition aid is eliminated. These and other advantages of the present invention will become apparent to those skilled in the art upon a reading of the following Detailed Description of the Invention together with the drawings.

SUMMARY OF THE INVENTION

A token ring concentrator for use in a token ring (sometimes referred to as a token passing ring) local area network.

The concentrator includes a plurality of ports for connection to network computers or other forms of data terminal equipment (DTE) to the concentrator.

Each port of the concentrator has associated circuitry which includes receiving means for receiving data on the ring which is typically produced by the previous DTE on the ring. The data are typically Differentially Manchester encoded data which has at least one transition each bit time. The received data is usually distorted in terms of amplitude and phase (phase jitter). The amount of phase distortion places an upper limit on the number of stations (DTE) that can be connected to the ring. Furthermore, eye closure (which prevents recovery of data) caused by cable attenuation and crosstalk limits the length of the lobe cables between stations.

The circuitry associated with each port further includes data regeneration/timing means which both regenerates and retimes the received data to reduce the distortion. The regeneration/retiming means includes amplifying means for amplifying the received data thereby reducing the amplitude distortion. Recovery means are further included for recovering a clock from the amplified data. This is accomplished using an inductor/capacitor tuned circuit, preferably a tank circuit which resonates at twice the frequency of the bit rate. The recovered clock has substantially reduced phase distortion in comparison to the received data.

Sampling means are also included for sampling the amplified received data using the recovered clock. This can be carried out utilizing a D type flip-flop having a clock input which receives the recovered clock and a data input which receives the amplified received data. The sampling means output is the regenerated and retimed data having substantially less amplitude and phase distortion (phase jitter) than the received data.

Transmitting means are also included for transmitting the regenerated and retimed data to the ring. Typically, the data are transmitted to the DTE connected to the associated port.

DETAILED DESCRIPTION OF THE INVENTION

Figure 3:
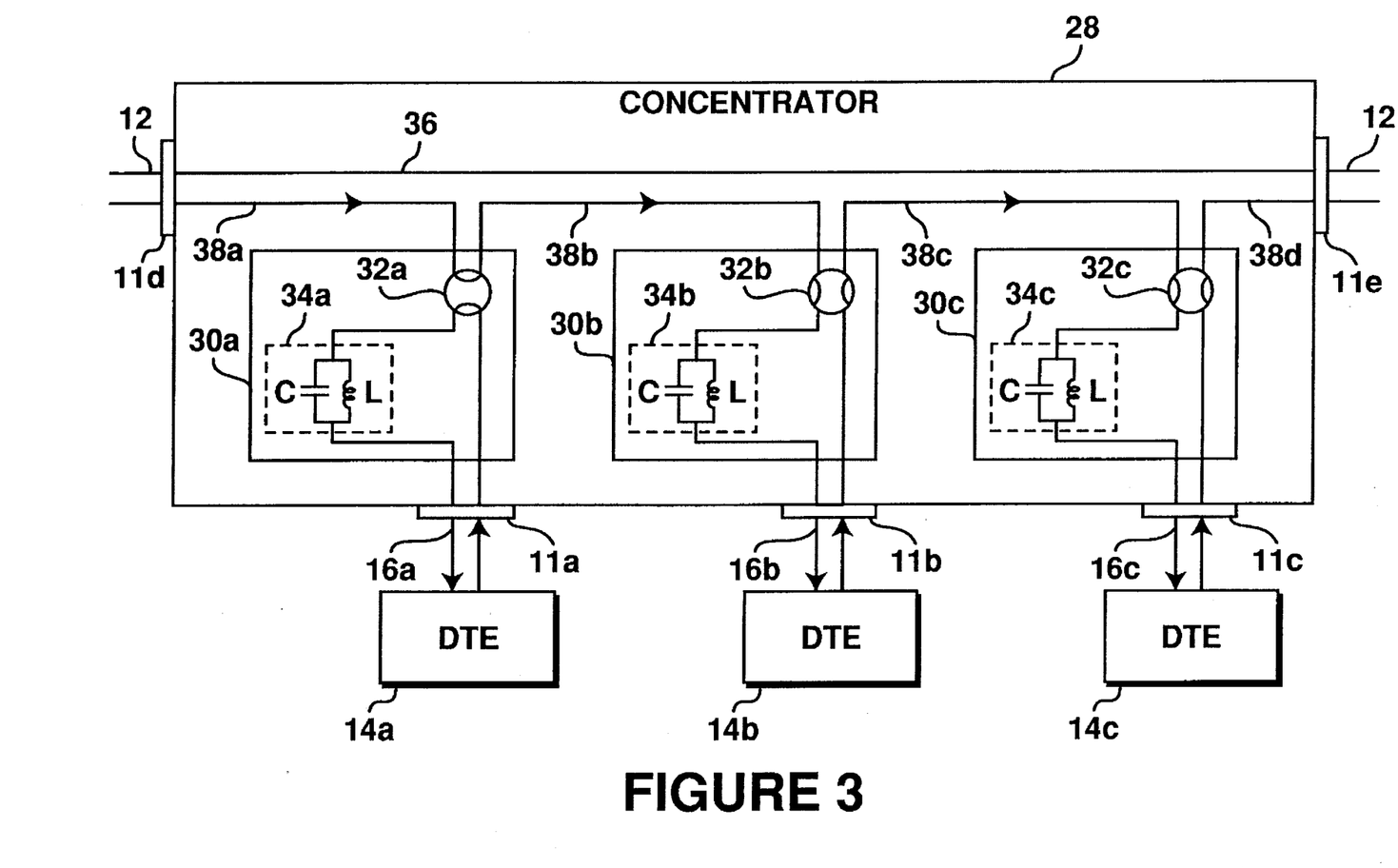
FIG. 3 is a block diagram of a concentrator in accordance to the present invention which incorporates a timing/regeneration circuit associated with each port which utilizes an L/C circuit for clock recovery and retiming.

Referring again to the drawings, FIG. 3 is a block diagram of a concentrator 28, in accordance with the present invention, which includes circuitry for regenerating data and for clock recovery. Concentrator 28 includes three ports 11a, 11b, and 11c shown connected to three DTEs 14a, 14b, and 14c, respectively by way of lobe cables 16a, 16b and 16c, respectively. The lobe cables are unshielded twisted pair (UTP) cables. The concentrator further includes ports 11d and 11e for connecting the concentrator to other concentrators of the token ring network by way of trunk cables 12.

Concentrator 28 includes a line 38a which represents the cable for receiving Differential Manchester encoded data from the previous DTE on the ring. The data are received by a timing/regeneration circuit 30a which includes a port insertion relay 32a which either bypasses port 11a, as shown, or forwards the regenerated and retimed data to the DTE 14a connected to the port.

A further line 38b represents the connection of timing/regeneration circuit 30a to timing/regeneration circuit 30b associated with DTE 14b. Circuit 30b is identical to circuit 30a and includes a port insertion relay 32b which either forwards the data on line 38b to DTE 14b or bypasses port 14b entirely. Relay 32b is shown in the position where data on line 38b is forwarded to DTE 14b and where data from DTE 14b is forwarded to line 38c.

Data from circuit 30b on line 38c is received by a third timing/regeneration circuit 30c associated with port 11c. Circuit 30c also includes a port insertion relay 32c which performs the same function as relays 32a and 32b. The relay is shown in the position where DTE 14c is in the ring rather than being bypassed. The data output of circuit 30c on line 38d is the forwarded to the next station on the ring. The next station may be located at another concentrator. Alternatively, the network may only include a single concentrator. In that case, ports 11d and 11e are bypassed so that the data from circuit 30c is fed back to circuit 30a by way of line 36.

Figure 4:
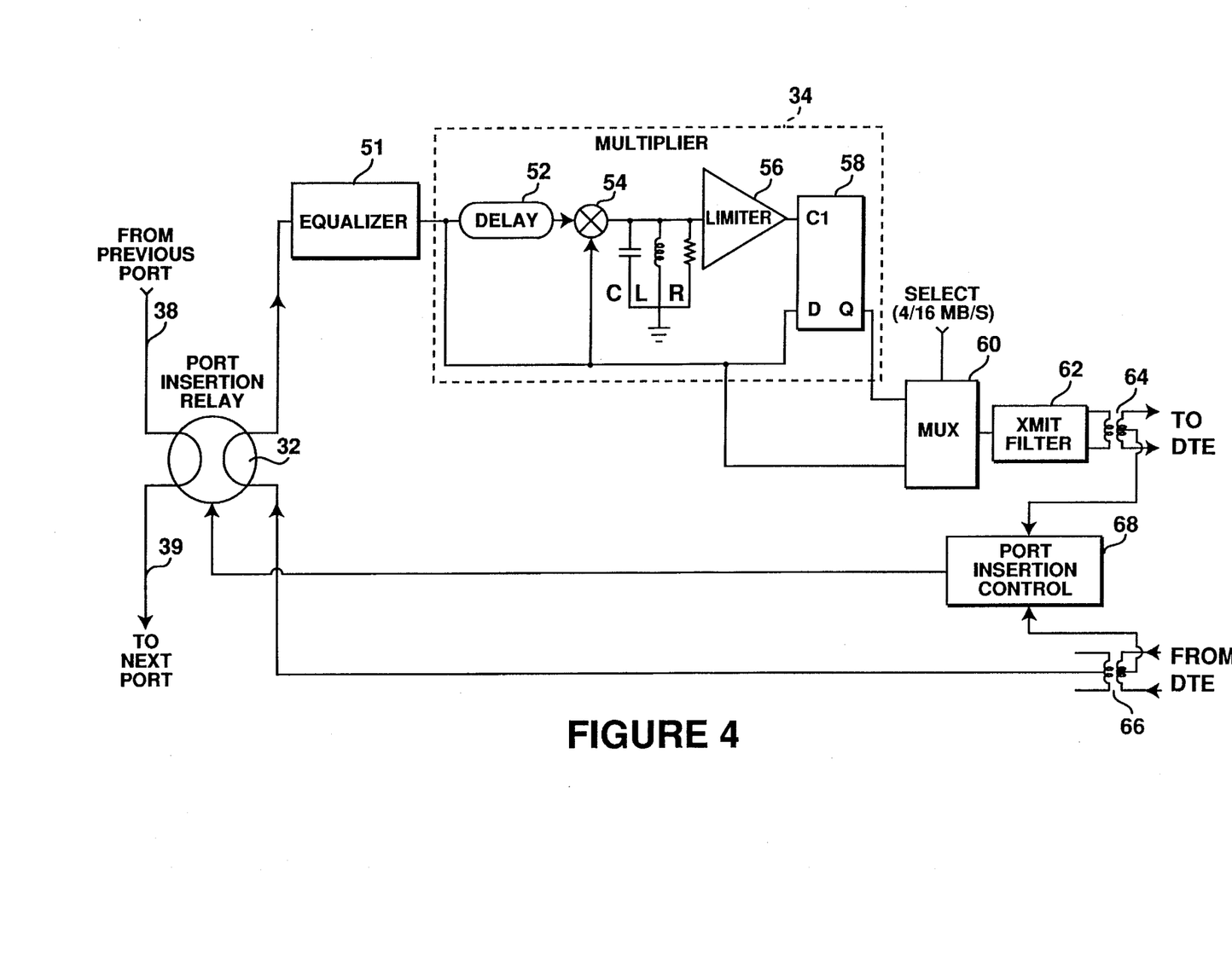
FIG. 4 is a block diagram of the timing/regeneration circuit used in the FIG. 3 concentrator.

FIG. 4 shows some of the details regarding the construction and operation of the timing/regeneration circuit 30 associated with each port 11 of the concentrator (with the exception of the ports used for connecting to the other concentrators). The circuit receives the Differential Manchester encoded data from the previous port on line 38. The FIG. 5 timing diagram includes a waveform 40 which depicts an exemplary data sequence of "0", "1", "1", "1", "0", "0", "0" and "1". The data sequence is at a rate of 16 Mb/s so that each bit has a period of about 62.5 nanoseconds. As is well known, Differential Manchester encoded data includes a transition in the center of each bit period. If the bit is a "0", there is a transition at the beginning of the period. If the bit is a "1", there is no transition at the beginning of the period, as can be seen in waveform 40.

Figure 5:
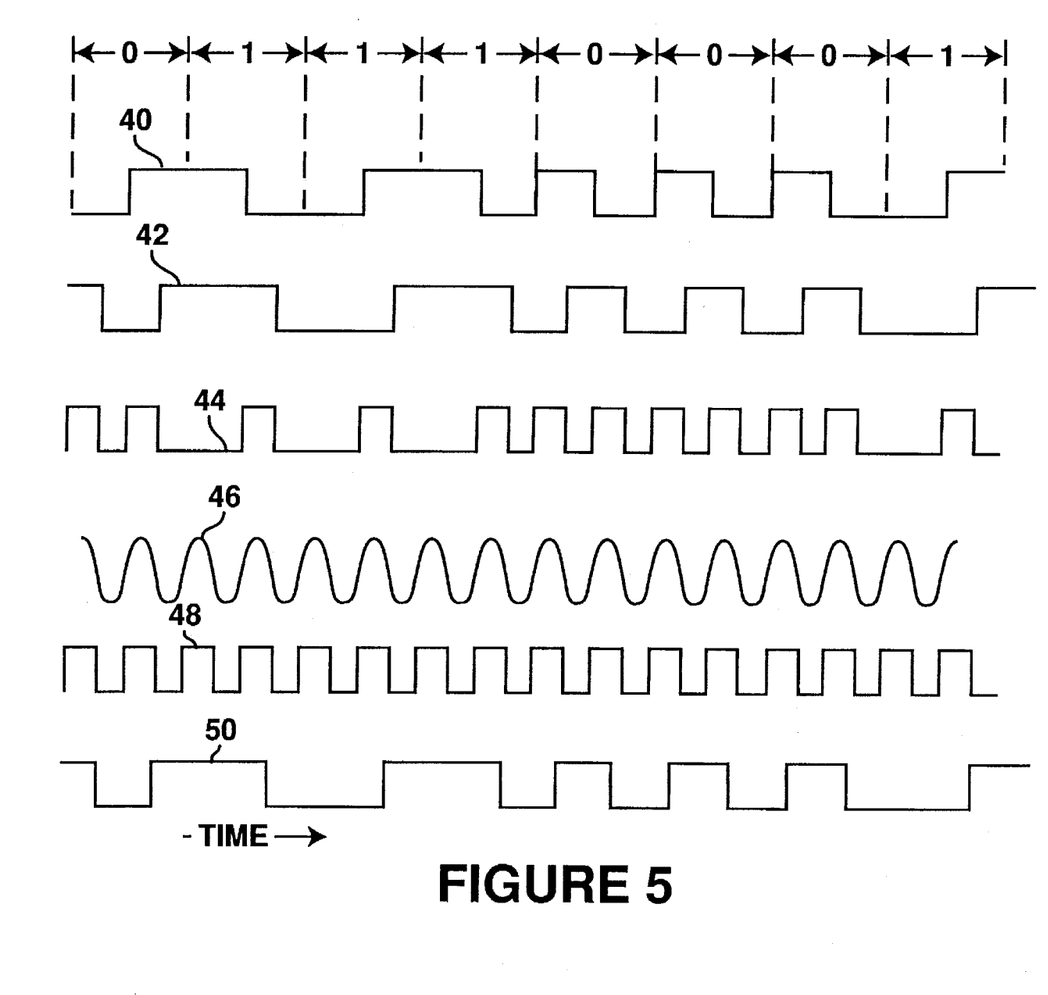
FIG. 5 is a timing diagram showing the various signals produced in the FIG. 4 timing/regeneration circuit.

Although not shown in the FIG. 5 waveform 40, the received data is distorted in phase and amplitude. This distortion is largely introduced in the lobe cables 16 (FIG. 1) which connect the DTEs to the concentrator. The phase distortion is largely manifested as phase jitter.

Referring back to FIG. 4, the data is either shunted to the next port by way of line 39 (the subject port is bypassed) or is forwarded to the DTE associated with the timing/regeneration circuit depending on the state of the port insertion relay 32. Assuming that the port is not bypassed, the relay will forward the data to an equalizer circuit 51. One function of circuit 51 is to boost the high frequency components of the received data which are attenuated by the lobe cables. A second function is to regenerate the data using amplifier circuits present in the equalizer. A third function is to limit the signal and condition it to levels compatible with integrated circuit logic gates which follow it.

The output of the equalizer circuit 51 is coupled to the retiming circuit 34 (FIG. 3). The output is fed to a delay circuit 52 which introduces a delay of one quarter of the bit period, or about 15.6 nanoseconds. The delayed equalizer output is represented by waveform 42.

The delayed equalizer output and the undelayed output are coupled the to the inputs of a digital multiplier 54. Multiplier is preferably implemented using an Exclusive OR circuit which, by definition, provides an output whenever the two inputs differ. The output of multiplier 54 is a train of pulses which occur each time there is a transition in the received data and which have a pulse width which is equal to the delay of delay circuit 52. The output, which is represented by waveform 44, contains the phase jitter present in the received data.

The multiplier output is fed to an inductor/capacitor (L/C) tank circuit which is tuned to twice the bit rate of the input data or to 32 MHz. Although not shown in FIG. 4, the multiplier 54 output drives the tank circuit through an resistance which functions to isolate the multiplier output to some degree from the tank circuit. Resistor R is effectively connected in parallel with the capacitor C and inductor L to control the Q of the circuit.

The Q of the circuit is equal to the ratio of the resistor R to the reactance of either the inductor L or the capacitor C at the resonant frequency of the circuit. The bandwidth (passband between points where response is attenuated 3 dB from that of the center frequency) is equal to the center frequency divided by the Q of the circuit. The response to a step in phase of the incoming waveform to the tank circuit is proportional to the single-sided bandwidth of the circuit which is defined as the difference between the resonant frequency of circuit and the point removed from center frequency where the response is attenuated by 3 dB. The single-sided bandwidth is set to be approximately equal to the loop bandwidth of the phase locked loops used in each station (DTE), i.e. 1 MHz single-sided response or 2 MHz between 3 dB points.

The output of the multiplier 54 causes the tank circuit to ring at an average frequency of the signal driving the tank. Any difference between the driving signal and the resonant tank frequency will result in a shift in phase. The circuit is underdamped so that the ringing will continue for several cycles. Since the Differential Manchester encoded data will have at least one transition every bit time, the sinusoidal signal across the tank circuit, which is represented by waveform 46 of FIG. 5, will appear to be continuous.

The frequency of oscillation at the tank circuit is determined by the bit rate of the data applied to the retiming element. The missing transitions in the data stream will cause a loss of energy used to "ring" the tank, but the oscillatory energy stored in the tank will be sufficient to maintain timing through this period. In addition, the relatively narrow bandwidth of the LC circuit will tend to filter or "average" the position of the transitions, removing the high frequency jitter components present at the input of the retiming element.

Although not shown, the tank circuit signal is amplitude modulated, with the instantaneous amplitude being determined by the transition density of the incoming waveform. For example, the amplitude across the tank when all the differential Manchester data consists of a string of "1"s (8 MHz) will be one-half that present relative to the amplitude when a string of "0"s are transmitted (16 MHz) since the transition density is only one-half. The rate of change in instantaneous amplitude resulting from a change in input waveform transition density is determined by the bandwidth of the tank circuit.

The sinusoidal signal is coupled to the input of a limiter circuit 56 which functions to square up the sine wave and eliminate the amplitude modulation. Limiter circuit 56 provides an output which alternates between the appropriate logic level for digital signals. The limiter output, represented by waveform 48, is used as a clock for a D-type flip-flop 58. The D input to the flip-flop is the undelayed output of equalizer circuit 51 which contains the phase jitter of the original received data. Flip-flop 58 functions as a sampling gate, as will be explained.

The output of flip-flop 58, which is depicted by waveform 50, corresponds with the data input, except it delayed one clock time. The transitions in the output coincide with the falling edge of the relatively jitter-free clock, therefor a large amount of the jitter is eliminated.

The flip-flop 58 output is fed to one input of a two-input multiplexer 60. The remaining input to multiplexer 60 is the direct output of equalizer 51. Multiplexer 60 is controlled by a Select signal which indicates whether the frequency of operation of the token ring network is at 4 MB/s or 16 MB/s. When operation is at 4 MB/s, the multiplexer selects the direct output so that the retiming function is bypassed.

The output of multiplexer 60 is coupled to a transmit filter 62 which drives a transformer 64. Filter 62 functions to condition the signal for transmission to the DTE connected to the port associated with the subject timing/regeneration circuit by way of UTP cable.

The receiving DTE then regenerates and retimes the received data in the conventional manner (FIG. 2). The Differential Manchester encoded data from the associated DTE is received by the primary of a transformer 66. The data are then forwarded to the port insertion relay 32 which causes the data to be transmitted to the next port assuming that the associated DTE is in the ring.

Each DTE of the a token ring network is implemented to activate the associated circuitry of the concentrator so as to either connect or disconnect the DTE from the network. The DTE accomplishes this task by generating a DC voltage on the lobe cables which connect the DTE to the concentrator. Port insertion control circuitry 68 detects the presence or absence of the DC level and controls the state of port insertion relay 32 accordingly.

Figure 6A:
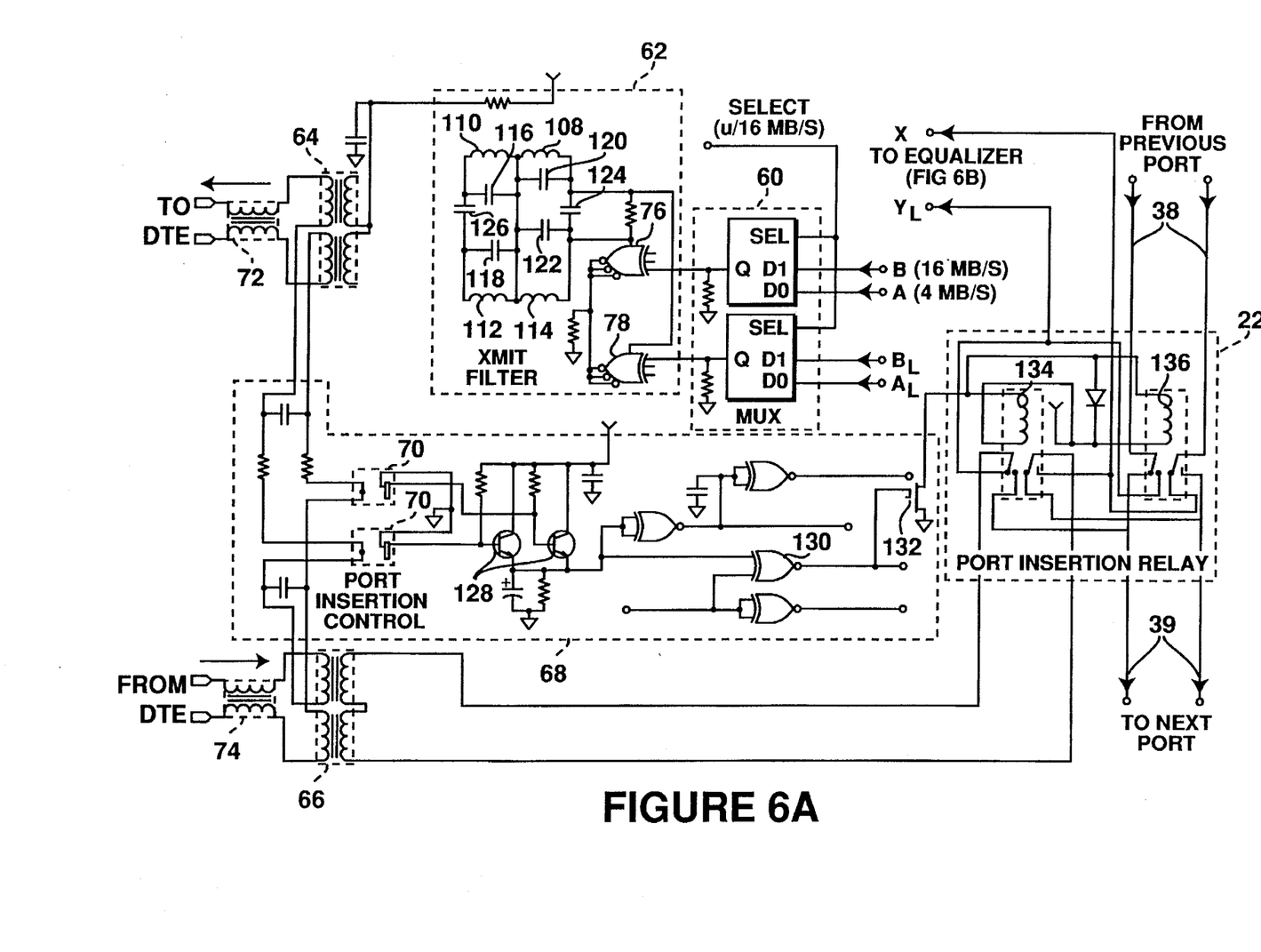
FIGS. 6A and 6B are detailed schematic diagrams of the FIG. 4 timing/regeneration circuit.
Figure 6B:
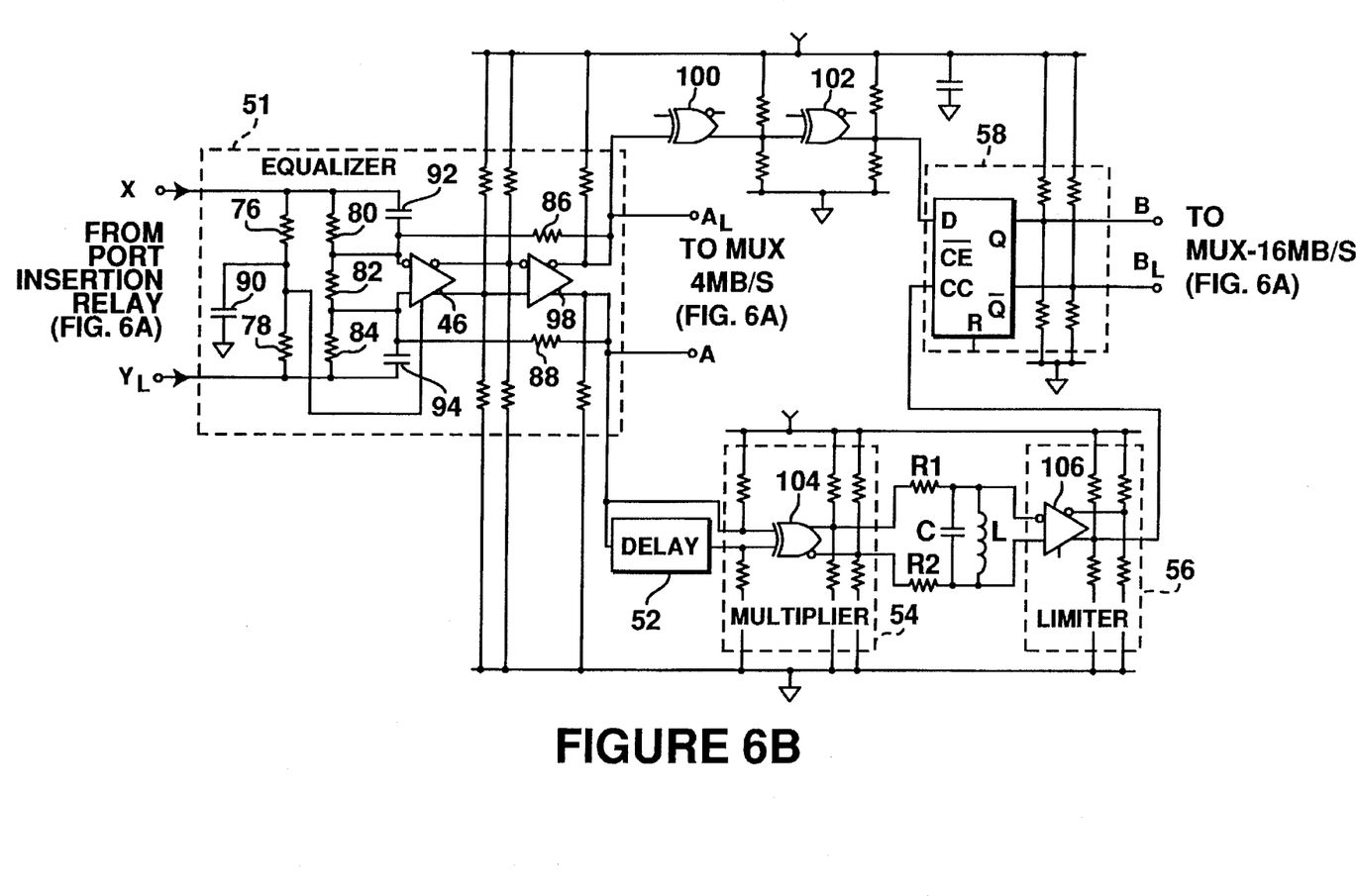

FIGS. 6A and 6B show further details regarding the implementation of the FIG. 4 block diagram and FIGS. 6A and 6B. The numerical identifiers of FIG. 4 indicate the same elements as the identifiers in FIGS. 6A and 6B. Referring to FIG. 6B, equalizer 51 has a pair of inputs for receiving differential outputs from the port insertion relay 32. Depending upon the state of the relay, the input will be from either the previous port (when the associated DTE is connected in the ring) or from the associated DTE (when the associated DTE is not in the ring).

Equalizer 51 boosts high frequencies utilizing an RC network which includes resistors 76 and 78 (both 51 ohms), resistors 80 and 84 (both 2.21 k ohms), resistors 86 and 88 (both 20 k ohms) and resistor 82 (1 k ohms). The network further includes capacitor 90 (0.1 micro F) and capacitors 92 and 94 (both 33 pF). The R/C network differentially drives series-connected gates 96 and 98 which are cascaded sections of MC10116 line receivers made by Motorola Inc. which serve to amplify and limit the signals and provide levels which are compatible with the logic gates which follow.

The inverted output of equalizer 51 drives a second pair of series-connected gates 100 and 102 which are MC10107 devices made by Motorola, Inc. Gates 100 and 102 provide a small delay to compensate for the delay produced by other components to be described (elements 104 and 106). The output of gate 102 is connected to the D input of a D flip-flop 58.

The differential outputs of gate 98 are connected directly to the input of multiplexer 60 (FIG. 6A). The non-inverted output of gate 98 is also connected to the input of delay circuit 52 which provides the one quarter bit time delay of about 15.6 nanoseconds. Circuit 52 is implemented using a PE23133 hybrid circuit made by Pulse Engineering of San Diego, Calif. The gate 98 output is also directly connected to one input of an Exclusive OR gate 104 which acts as a multiplier. Gate 104 is preferably an MC10107 device made by Motorola, Inc. The second input to gate 104 is connected to the output of delay 52.

The output of multiplier 54 drives the tank circuit which includes capacitor C and inductor L connected in parallel. Resistors $R_1$ and $R_2$ are connected to the respective differential outputs of gate 104 and function to isolate the low impedance gate output from the tank circuit and function, in combination with the input impedance of the following gate, to set the Q of the tank circuit as does resistor R of FIG. 4.

The tank circuit is tuned to twice the data input or to a frequency of to 32 MB/s. Nominally, C has a capacitance of 68 pF which typically can vary $\mp 55$ percent and L has an approximate inductance of 0.33 micro Henries. The inductance L is tuned so that the resonant frequency is at 32 MB/s. Resistors $R_1$ and $R_2$ each are 1.1 k ohms.

The differentially-driven tank circuit is coupled to the differential inputs of an MC10116 driver which acts as a limiter, as previously noted. The non-inverted output of driver 106 is connected to the clock input of flip-flop 58 which is implemented using an MC10131 D type flip-flop made by Motorola Inc.

The differential outputs of flip-flop 58 are fed to one set of inputs of multiplexer 60 (FIG. 6A). The other set of inputs to the multiplexer come directly from gate 98 of the equalizer 51. Multiplexer 60 is implemented using two MC10158 selector circuits also made by Motorola Inc. Depending on the level of the Select signal, either the 16 MB/s or the 4 MB/s differential signals are selected, depending upon the frequency of operation of the token ring network.

The output of the multiplexer 60 is fed to the transmit filter 62 which is implemented using a pair of MC10111 gates 76 and 78 made by Motorola Inc. Gates 76 and 78 function together as differential buffers which differentially drive the L/C network which forms the filter. The network includes capacitors 116 and 118 (both 22 pF), capacitors 120 and 122 (both 10 pF), capacitor 124 (47 pF) and capacitor 126 (33 pF). The network also includes inductors 108, 110, 112, and 114 (all 0.56 micro Henries).

The output of filter 62 drives the primary of transformer 64, with the secondary of the transformer forwarding the regenerated and retimed data to the associated DTE by way of a choke 72 which functions to reduce EMI. Data from the associated DTE is received by the primary winding of transformer 66 by way of a second choke 74 which also functions to reduce EMI.

FIG. 6A also includes the port insertion relay 22 having two sets of contacts, including one set connected to lines 38 for receiving data from the previous port and a second set connected to transformer 66 for receiving data from the associated DTE. Relay 22 is controlled by the port insertion control 68.

The circuitry of control 68 includes a pair of optical isolators 70 which are coupled to the primary windings of transformers 64 and 66. The output of the optical isolators 70 control the state of two discrete bipolar transistors 128 which drive various logic gates, including gate 130. Gate 130 drives a field effect transistor 132 which, in turn, drives the two coils 134 and 136 of port insertion relay 22. As previously noted, the port insertion control detects the presence of a DC voltage on the UTP cables to and from the associated DTE and either insert or remove the DTE from the network in response thereto.

As previously noted, Differential Manchester encoding provides for a data transition during the middle of each bit time for both "1"s and "0"s and also at the beginning of each bit time when the bit is a "0". Thus, there are more data transitions when the bit stream contains all "0"s than when the stream contains all "1"s. Assuming that the data rate is 16 MBS, there will be $16 \times 10^6$ transitions if the data stream is all "1"s and $32 \times 10^6$ if the stream is all "0"s.

It has been found that a data shift from all "1"s to all "0"s or vice versa results in an unequal phase step response. When the transition from all "1"s to all "0"s occurs, the number of data transition doubles thereby increasing the instantaneous amplitude of the sinusoidal signal across the L/C tank circuit (waveform 46 of FIG. 5 is not shown to scale and does not show this difference in amplitude). This increased amplitude will cause the tank circuit to adjust to the new phase more quickly due to the increased energy available from the higher transition density.

The opposite is true for a data shift from all "0"s to an all "1"s. The lower transition density available in the all "1"s case will result in a slower phase adjustment by the tank circuit. The net result is that the recovered clock is likely to have excessive alignment errors in the presence of crosstalk, especially when unshielded twisted pair are used.

Figure 7:
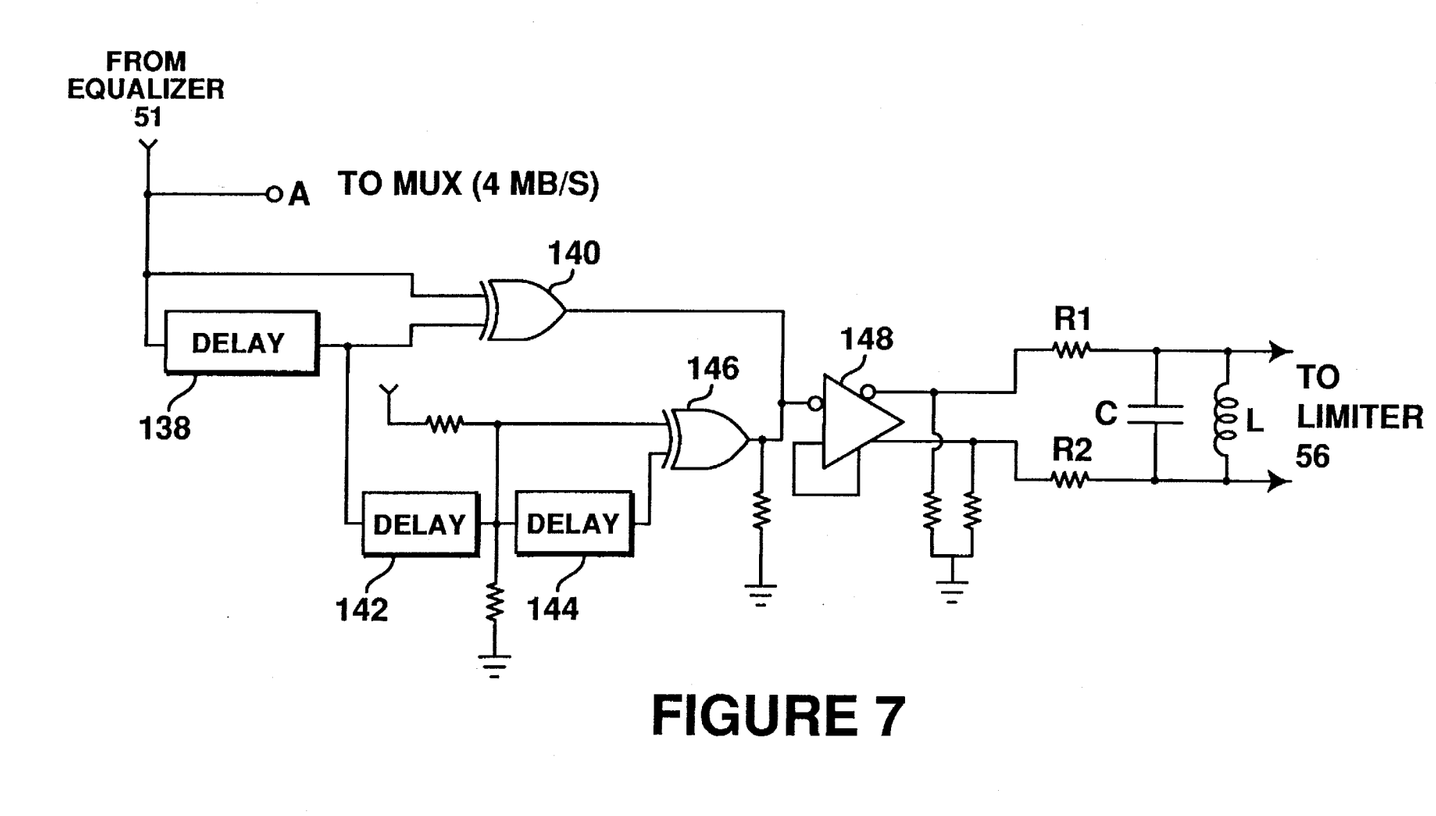
FIG. 7 is a partial detailed schematic diagram of a modified timing/regeneration circuit.

The modified timing/regeneration circuit shown in FIG. 7 substantially eliminates alignment errors in the recovered clock which are caused by the difference in the number of data transitions for the all "0"s and all "1"s conditions. The circuitry shown in FIG. 7 is intended to replace the circuitry between the equalizer 51 of FIG. 6B and the limiter circuit 56 shown in that figure.

The FIG. 7 circuit includes a delay circuit 138 and an exclusive OR gate 140 which perform substantially the same function as gate 104 and delay 52 of the FIG. 6B circuit. Delay 138 provides a delay of 15.6 nanoseconds, which is one quarter the bit period of the received encoded data, and gate 140 provides a multiplier function.

The output of delay circuit 138 is delayed further by two additional delay circuits 142 and 144, each of which also provide a delay of 15.6 nanoseconds. The outputs of delay circuits 142 and 144 are coupled to the respective inputs of a two-input exclusive OR gate 146. The output of gates 140 and 146 are both connected to the inverting input of a differential driver circuit 148. The differential outputs of driver 148 are coupled across the L/C tank as in the previously-described circuit of FIG. 6B.

Figure 8:
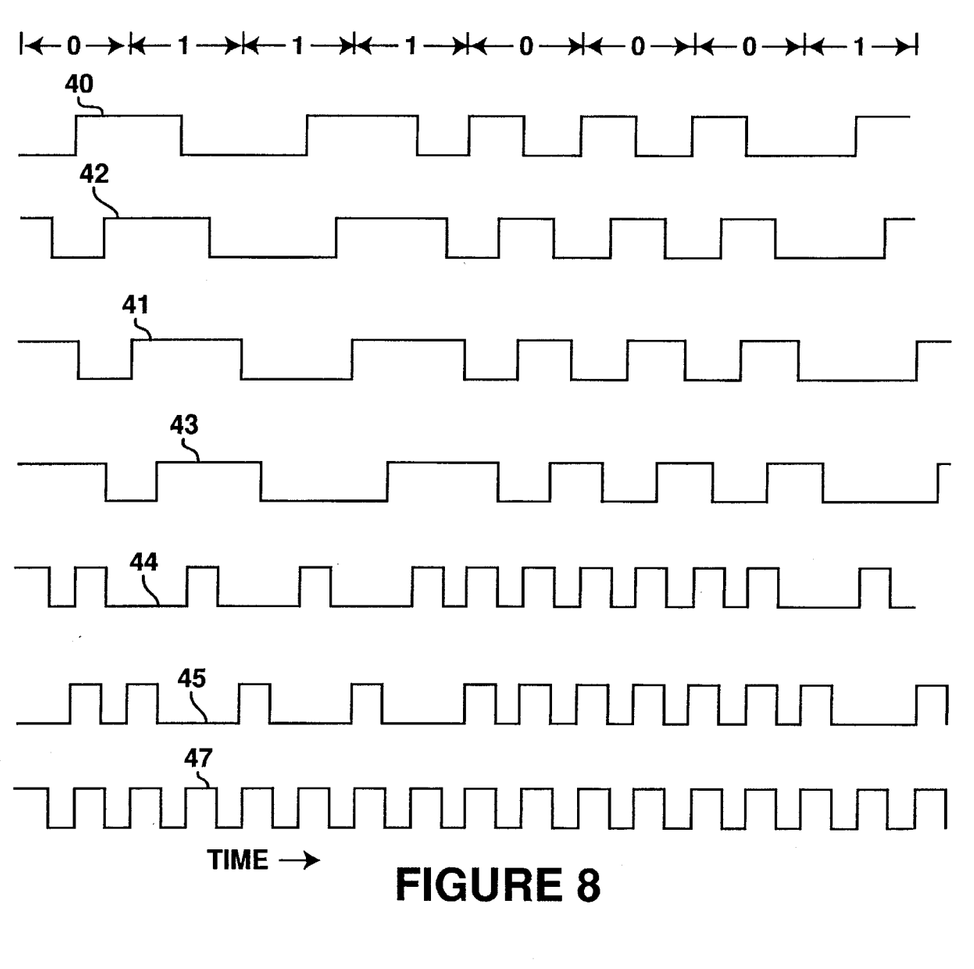
FIG. 8 is a timing diagram showing some of the signals produced by the modified timing/regeneration circuit of FIG. 7

Referring to the timing diagram of FIG. 8, an exemplary encoded data stream similar to the data stream of FIG. 4 is depicted. The Differential Manchester encoded data present at the output of the equalizer 51 (FIG. 7) and which is represented by waveform 40, is "0", "1", "1", "1", "0", "0", "0" and "1". As can be seen from waveform 40, there are more transitions in the data when "0"s are received than when "1"s are received.

Waveform 42 represents the output of the delay circuit 138 and waveform 44 represents the output of gate 140, ignoring for the moment the effect of gate 146. Waveforms 41 and 43 represent the outputs of delay circuits 142 and 144, respectively. Waveform 45 represents the output of gate 146 when the signals represented by waveforms 41 and 43 are exclusive ORed together and when the effect of gate 140 is ignored. Since the gate 140 and 146 outputs are connected together, the outputs are effectively wire ORed together. Waveform 47 represents signals 44 and 45 ORed together.

It can be seen from waveform 47 that the signal driving the L/C tank circuit remains fixed and is independent of whether the encoded data contains "0"s or "1"s. The amount of energy exciting the L/C tank circuit remains fixed as does the sinusoidal voltage developed across the tank circuit. Thus, the recovered clock will have no alignment errors due to a change between input data of all "0"s and all "1"s. In order to compensate for the additional propagation delay provided by the added gates of the FIG. 7 embodiment, an additional compensating gate may be inserted in series with gates 100 and 102 shown in FIG. 6B.

Thus, a novel concentrator for token ring networks has been disclosed. Although a particular embodiment has been described in some detail, it is to be understood that changes can be made by those skilled in the art without departing from the spirit and scope of the invention as defined by the appended claims.

We claim:

1. An apparatus comprising:
   a token ring concentrator having a plurality of ports, with each port for connection to data terminal equipment (DTE) so that the DTE are arranged in ring topology, each of said ports further including:
   receiving means for receiving data from the ring;
   data regenerating/retiming circuit means for regenerating the received data and for retiming the received data so as to produce regenerated and retimed data, the regenerating/retiming means comprising:
   a) amplifier means for amplifying the received data;
   b) recovery means for recovering a clock from the amplified received data using a tuned circuit which includes an inductor and capacitor;
   c) sampling means for sampling the amplified data using the recovered clock, with the sampled data being the regenerated and retimed data; and
   transmitting means for transmitting the regenerated and retimed data to the ring.

2. The concentrator of claim 1 wherein the received data is encoded data having at least one transition per bit period and wherein the recovery means includes transition means for producing a transition signal for each transition in the received data.

3. The concentrator of claim 2 wherein said transition means produces the same number of transition signals per bit period independent of the encoded data.

4. The concentrator of claim 3 wherein said transition means produces two transition signals per bit period.

5. The concentrator of claim 2 wherein the transition means includes delay means for delaying the received data for a fraction of the bit period and multiplier means for multiplying the received data and the delayed received data together to produce the transition signal.

6. The concentrator of claim 5 wherein the delay means includes a delay circuit which delays the received data approximately one quarter of the bit period.

7. The concentrator of claim 6 wherein the multiplier means includes gating circuitry which performs an exclusive OR function on the received and delayed data.

8. The concentrator of claim 7 wherein the sampling means includes a bistable circuit having a clock and a data input which receive the amplified data and the recovered clock, respectively.

9. The concentrator of claim 8 wherein the bistable circuit is a D type flip-flop.

10. The concentrator of claim 1 wherein the inductor and the capacitor have values such that the tuned circuit resonates at an integral multiple of the bit rate of the received data.

11. The concentrator of claim 10 wherein the resonant frequency is twice the bit rate of the received data.

12. The concentrator of claim 11 wherein the resonant frequency is 32 MHz and the bit rate is 16 MB/s.

13. The concentrator of claim 12 wherein the tank circuit has a bandwidth ranging from 0.5 to 2 MHz.

14. The concentrator of claim 1 wherein the transmitting means transmits the regenerated and retimed data to the DTE connected to the associated port.

15. The concentrator of claim 1 wherein the data regeneration/retiming means further includes limiting means for amplitude limiting the amplified received data.

16. An apparatus comprising;
   a token ring concentrator having a plurality of ports, with each port for connection to a plurality of data terminal equipment (DTE) so that the DTE are arranged in a ring topology, each of the ports further including:
   receiving means for receiving Manchester encoded data from the ring having phase jitter,
   regenerating means for regenerating said received Manchester encoded data;
   transition means for producing a transition signal for each transition in said received Manchester encoded data, with the transition signal having phase jitter comparable to that of the received Manchester encoded dam:
   jitter reduction means for producing a clock signal from transition signal, having reduced jitter in comparison to the transition signal, utilizing a tuned circuit which includes an inductor and a capacitor,
   sampling means for sampling the regenerated received data using the clock signal; and
   transmitting means for transmitting the sampled regenerated data to the ring.

17. The concentrator of claim 16 wherein the jitter reduction means causes a substantially sinusoidal amplitude modulated signal to be developed across the tuned circuit and further includes limiter means for demodulating the modulated signal.

18. The concentrator of claim 17 wherein the concentrator is capable of operating at two different bit rates, including a high bit rate and a low bit rate and the concentrator includes bypass means for bypassing the transition, the jitter and the sampling means when operating at the low bit rate.

19. The concentrator of claim 16 wherein said transition means produces a number of said transition signals per bit time which is independent of the Manchester encoded data.

20. An apparatus comprising:
   a token ring concentrator having a plurality of ports, with each connection to a plurality of data terminal equipment (DTE) so that the DTE are arranged in a ring topology, each of the ports further including;
   receiving circuitry for receiving a digitally encoded data stream having at least one transition signal per bit period, said transition signal representing a clock signal, said clock signal independent of data contained in said digitally encoded data stream;
   a first, second, and third delay circuit for producing a first, second, and third delayed signals, respectively from said digitally encoded data stream;

a first logic circuitry for combining said digitally encoded data stream and said first delayed signal to produce a first combined signal;

a second logic circuitry for combining said second and said third delayed signals to produce a second combined signal;

a third logic circuitry for combining said first combined signal and said second combined signal to produce a transition signal;

a tank circuit, including an inductor and capacitor, excited by said transition signal so that a generally sinusoidal signal is produced at the tank circuit;

converting circuitry for converting the generally sinusoidal signal to the clock signal;

sampling circuitry for sampling the digitally encoded data stream using the clock signal; and transmitting circuitry for transmitting the sampled data to the token ring.

21. The circuit of claim 20 wherein said digitally encoded data stream is Differential Manchester encoded data.

22. The circuit of claim 20 wherein said first, second, and third delay means each produce a delay approximately equal to one quarter of a bit period.

23. The circuit of claim 20 wherein said first and second combining means perform logic exclusive OR functions.

24. The circuit of claim 20 wherein said third combining means performs logic wired OR function.

* * * * *